United States Patent [19]

Jackson

[11] 4,312,566
[45] Jan. 26, 1982

[54] DIELECTRIC OPTICAL WAVEGUIDE CABLES

[75] Inventor: Lynden A. Jackson, Ipswich, England

[73] Assignee: The Post Office, London, England

[21] Appl. No.: 72,632

[22] Filed: Sep. 5, 1979

Related U.S. Application Data

[63] Continuation of Ser. No. 835,440, Sep. 21, 1977, abandoned.

[30] Foreign Application Priority Data

Sep. 22, 1976 [GB] United Kingdom ............... 39327/76

[51] Int. Cl.³ ................................................ G02B 5/16
[52] U.S. Cl. .............................................. 350/96.23
[58] Field of Search ...................................... 350/96.23

[56] References Cited

U.S. PATENT DOCUMENTS

| 4,037,923 | 7/1977 | Beal | 350/96.23 |
| 4,072,398 | 2/1978 | Larsen et al. | 350/96.23 |
| 4,093,342 | 6/1978 | Foord et al. | 350/96.23 |
| 4,199,224 | 4/1980 | Oestreich | 350/96.23 |
| 4,230,395 | 10/1980 | Dean et al. | 350/96.23 |

FOREIGN PATENT DOCUMENTS

| 2414199 | 11/1975 | Fed. Rep. of Germany ... | 350/96.23 |
| 2275002 | 1/1976 | France | 350/96.23 |
| 2294460 | 7/1976 | France | 350/96.23 |

*Primary Examiner*—John D. Lee
*Attorney, Agent, or Firm*—Kemon & Estabrook

[57] ABSTRACT

A waveguide cable comprises an axially extending polymer sleeve, or group of sleeves, the molecules in the sleeve(s) being longitudinally orientated. The or each sleeve contains one or more dielectric optical waveguides. A plurality of elongate filamentary strengthening members encased in polymer sleeves extend axially of the cable around the polymer sleeve or sleeves.

7 Claims, 1 Drawing Figure

U.S. Patent  Jan. 26, 1982  4,312,566
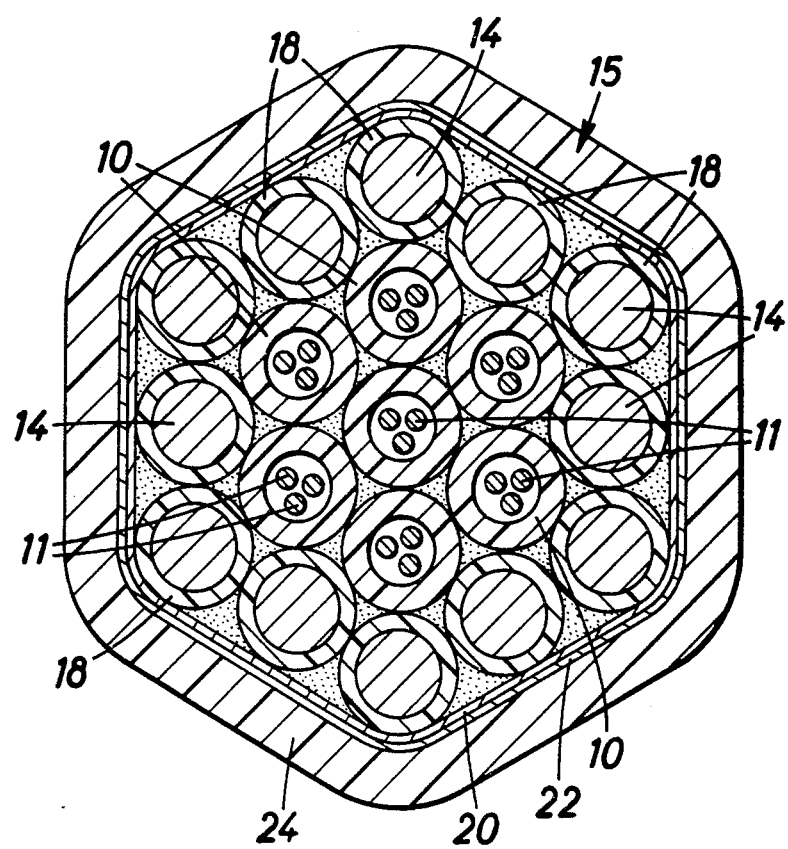

DIELECTRIC OPTICAL WAVEGUIDE CABLES

This is a continuation, of application Ser. No. 835,440, filed Sept. 21, 1977, now abandoned.

This invention relates to dielectric optical waveguide cables.

Dielectric optical waveguide cables are known in which dielectric optical waveguides are wound on a central deformable member. We have developed a dielectric optical waveguide cable which does not employ such a central member. Our design results, in part, from the development of stronger dielectric optical waveguides.

According to the present invention there is provided a dielectric optical waveguide cable comprising at least one axially extending, central polymer sleeve, the molecules of which are orientated to lie longitudinally of the sleeve, the or each sleeve containing one or more dielectric optical waveguides, a plurality of elongate strength members extending axially of the cable around the at least one polymer sleeve, and an outer sheath surrounding the at least one sleeve and the strength members.

By polymer we have in mind synthetic extrudable polymers of which polypropylene is a preferred example, and the term polymer is intended to include any material whose molecules can be orientated to lie longitudinally with respect to the axis of a sleeve which is produced by the process described in British patent application No. 686,375.

The strength members may be filamentary and may be encased in polymer sleeves.

The outer sheath of the cable may comprise an inner first layer formed by winding a tape spirally in a first sense around the strength members, a second layer formed by winding tape spirally in a sense opposite to said first sense around the first layer, and an outer extruded sheath portion. The tape forming said first and second layers may be corrugated. The outer sheath portion may be formed from extruded polyethylene.

The invention will be described now by way of example only with particular reference to the accompanying drawing which is a cross-section through a dielectric optical waveguide cable in accordance with the present invention.

The dielectric optical waveguide cable comprises seven centrally located, axially extending polypropylene sleeves 10 each of which houses three dielectric optical waveguides 11; twelve axially extending filamentary strength members 14 disposed around the centrally located sleeves 10; and an outer sheath 15 surrounding the sleeves 10 and strength members 14.

Each polypropylene sleeve 10 is produced by the extrusion method described in British patent application No. 686,375. The sleeves produced by this method have their molecules orientated to lie longitudinally of the sleeve. Such sleeves have relative strength in a longitudinal plane and relative weakness in a transverse plane.

Each strength member 14 is accommodated within a polypropylene sleeve 18, each sleeve 18 being made by the same process and being of similar form and diameter to the sleeves 10. It is envisaged that a wide range of materials could be used for the strength members 14. Materials at present under consideration are stranded steel, Kevlar 49 polymer twists and glass fibre rovings. It is also envisaged that if a very high modulus orientated polymer sleeve 18 were to be developed it could serve as the strength member itself without any material therein.

The interstices of the sleeves 10 and the sleeves 18 are filled with petroleum jelly to prevent ingress of water. A flexible or semi-flexible epoxy could be used instead of the petroleum jelly if a greater degree of retention for the sleeves 10, 18 within the sheath 15 is required.

The outer sheath 15 comprises an inner first layer 20 formed from corrugated Mylar tape, a second layer 22 also formed from corrugated Mylar tape and an outer sheath portion 24 formed of extruded polyethylene. The inner layer 20 is formed by winding Mylar tape in a spiral around the group of sleeves 10 and 18 so that it has a left hand lay. The second layer 22 is formed by winding a similar Mylar tape over the first layer in a spiral with a right hand lay so that the corrugations lock thereby preventing adjacent turns from slipping apart during bending of the cable. Typically the thickness of the Mylar tape is 50 microns and the depth of the corrugations in each tape is 250 microns. The outer sheath portion 24 can be extruded by conventional techniques.

The arrangement of the two layers 20 and 22 has a loop strength which is relatively high. Furthermore, because the second layer is wound in an opposite sense to that of the first layer a very effective heat barrier is formed. The outer polyethylene sheath portion 24 keys to the second layer of corrugated Mylar tape. The two tape layers can slide easily over each other and hence allow for some contraction of the outer sheath portion during the extrusion process.

The present optical waveguide cable provides a relatively high signal carrying capacity for a relatively small size. The use of filamentary strength members gives the cable good flexibility. The cable is relatively easy to make and it can be modified easily to allow for any improvements in the strength of dielectric optical waveguides which may be made in the future. For example, it is envisaged that as the strength of optical waveguides is improved it may be possible to replace the strength members with optical waveguides. Furthermore, the optical waveguides lie axially along the cable thereby keeping to a minimum micro-bending problems.

The illustrated embodiment uses three optical waveguides in each polymer sleeve 10. In theory any number of waveguides could be used in a single polymer sleeve. Similarly the number of sleeves contained within the outer sheath can be varied.

I claim:

1. A dielectric optical waveguide cable of the type having a core structure and an outer sheath surrounding the core structure, said core structure comprising a plurality of longitudinally extending filamentary members of circular cross-section which have substantially equal diameters and which are closely stacked together in a stable configuration such that each filamentary member contacts at least one adjacent filamentary member, at least some of said filamentary members being strength members and at least one of said filamentary members being a polymer sleeve loosely enveloping a dielectric optical waveguide, the molecules of said polymer sleeve being orientated longitudinally of the sleeve, and wherein the outer sheath comprises an inner first layer formed by a corrugated tape wound spirally in a first sense around said strength members, a second layer formed by a corrugated tape wound spirally in a sense opposite to the first sense around the first layer, and an outer sheath portion.

2. A cable as claimed in claim 1 wherein said polymer sleeve is formed from a synthetic extrudable polymer such as polypropylene.

3. A cable as claimed in claim 1 wherein each strength member comprises a filamentary core encased in a polymer sleeve.

4. A cable as claimed in claim 1 wherein said core structure comprises a plurality of centrally located polymer sleeves each enveloping at least one dielectric optical waveguide and a plurality of strength members disposed in an outer layer around the sleeved waveguides.

5. A cable as claimed in claim 1 wherein the core structure is generally hexagonal in cross-section and comprises a central filamentary member surrounded by one or more layers of filamentary members, the nth layer from the central filamentary member having 6n members.

6. A cable as claimed in claim 5 wherein an outer layer of filamentary members incorporates all of the strength members of the cable.

7. A cable as claimed in claim 1 wherein each strength member is composed of high modulus orientated polymer material.

* * * * *